Oct. 6, 1931.  P. GUILBERT ET AL  1,826,069
METHOD OF SUBSTITUTION OF RAILROADS BY MEANS OF SUBSTITUTION
TRAINS, AND MECHANICAL APPARATUS CONSTITUTING THE SAME
Filed June 9, 1928  9 Sheets-Sheet 4

Oct. 6, 1931.  P. GUILBERT ET AL  1,826,069
METHOD OF SUBSTITUTION OF RAILROADS BY MEANS OF SUBSTITUTION
TRAINS, AND MECHANICAL APPARATUS CONSTITUTING THE SAME
Filed June 9, 1928  9 Sheets-Sheet 9

Patented Oct. 6, 1931

1,826,069

UNITED STATES PATENT OFFICE

PAUL GUILBERT, OF ROUEN, JULES LEGRAND, OF ST. MANDE, AND MAURICE LEMAIRE, OF PARIS, FRANCE

METHOD OF SUBSTITUTION OF RAILROADS BY MEANS OF SUBSTITUTION-TRAINS, AND MECHANICAL APPARATUS CONSTITUTING THE SAME

Application filed June 9, 1928, Serial No. 284,080, and in France June 27, 1927.

This invention relates to the entirely mechanical execution of the work of relaying railroads including the picking up and the screening of the ballast and the reutilization of the old ballast.

Up to the present these works have been carried out with much manual labour, whereas the method and the mechanical apparatus which form the object of the invention require only a very restricted gang of workmen and only a few excavators.

This method is characterized in that it consists in uniting and in utilizing the mechanical apparatus necessary for the work in the form of a relaying train which circulates either on the track parallel to the track to be relaid, when the track is double, or on the track to be relaid, when the track is single.

This train comprises essentially a picking up and screening group, comprising on the one hand an excavator of a special type for the mechanical removing of the ballast from the track to be renewed and a screen with conveyors and on the other hand two or more hopper-cars for the mechanical loading of the old ballast. This train comprises further a generating set.

For double tracks the relaying train comprises further a group for picking up the elements of the track to be relaid, and a group for laying the elements for a fresh track.

This method and the corresponding mechanical apparatus, according to the invention will be hereinafter described in several forms of application by way of example with reference to the accompanying drawings, in which:—

The front end of the train is at a and its sections unite along the corresponding lines b—b, c—c, d—d, e—e. To more clearly illustrate the co-operation of the different elements of the train the illustration of each section comprises beyond the junction lines the adjacent elements of the adjacent sections.

According to the invention, the relaying train for a double track formed by the whole of the mechanical apparatus, which contribute to the realization of the corresponding method, circulates on the track parallel to the track to be relaid. This relaying train is composed of, (1) A group for removing the elements of the existing track, this group comprising a platform truck 2, 12 or 18 ms. long, for example of known type, enclosed by two cranes 3, 4 constructed specially for the application in question.

(2) A group for picking up the ballast composed of an excavator-car 5, of a special type which will be hereinafter described for mechanically removing the ballast from the track to be renewed.

(3) A screening group designed to separate from the ballast the fine elements and the earth which it might contain and to subsequently return the cleaned ballast upon the road-bed foundation which has been cleaned. This screening group is composed of a screening car 6 carrying a screener with conveyer and of two or more hopper-cars 7, carrying each a conveyer with scrapers designed for the mechanical charging of the detritus of ballast over the entire length of the hopper-car. The characteristic details of these apparatus will be hereinafter described.

(4) A group of laying elements for the fresh track all mounted with their sleepers. This laying group is composed of a platform-truck of 12 or 18 meters length, 8 for example, of commonly used type, carrying the elements of the fresh track put together, and of two special cranes 9, 10 enclosing the truck 8. These two cranes permit of gripping the track elements at their ends and putting the same in place upon the foundation of the track in course of relaying.

(5) A generating set 11 for steam, petrol, heavy oil or poor gas mounted on a car placed at any point of the relaying-train and which supplies with driving power all the electric motors operating the different elements of said relaying-train (excavators, conveyors, screener, cranes). On this car an electric motor is mounted designed for the pulling of the excavator and of the cars which follow behind. During the clearing of the ballast this motor permits of carrying out the displacement of the entire load at a speed of about 100 meters per hour.

(6) A group of two or more hopper-cars of commonly used type containing fresh ballast which will be shot onto the freshly laid track.

(7) A compressor-car placed at the end of the train supplying a group of rammers for the mechanical tamping of the track.

These two last mentioned groups are neither shown on the drawings nor specially described as the cars and apparatus which compose the same are of well known construction.

Cranes for discharging and laying

The two pick up cranes and the two laying cranes (Figs. 1 and 2) are of the same type. Each crane is independent and fixed at the end of a platform truck of usual type.

Figure 1A:
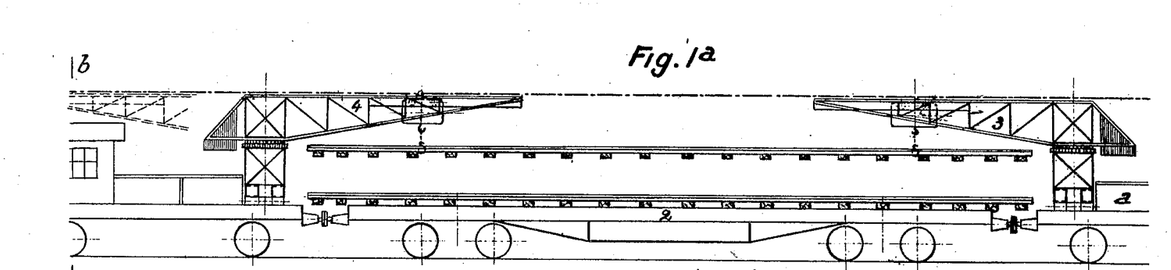
Figures 1a to 1e, inclusive, show in elevation the whole relaying-train which had to be subdivided into several sections placed the one under the other to fit into the size of the drawings.
Figure 1B:
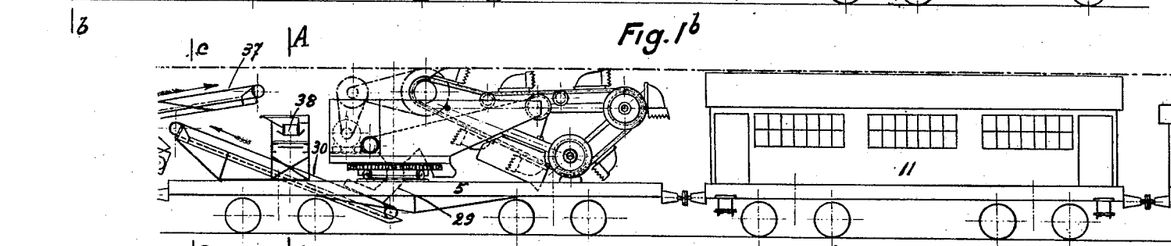
Figure 1C:
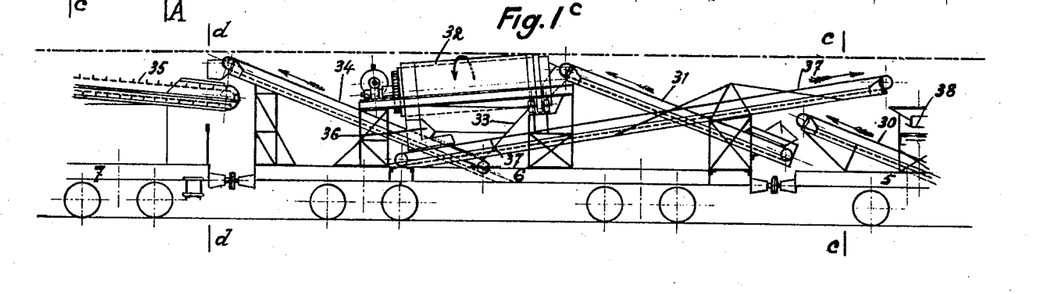
Figure 1D:
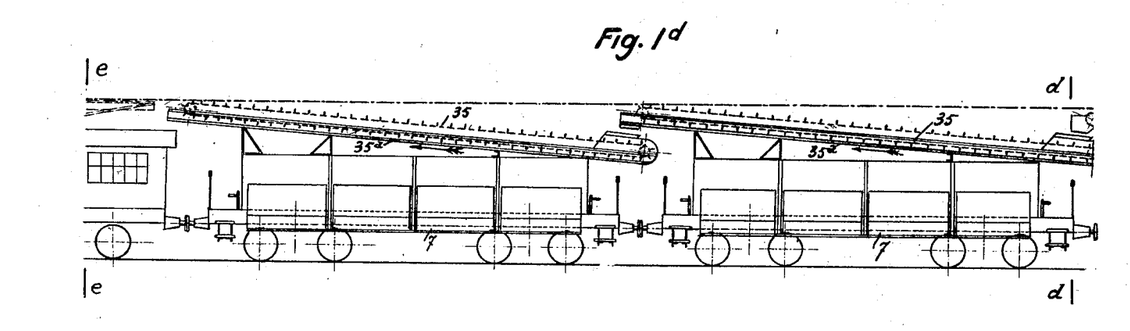
Figure 1E:
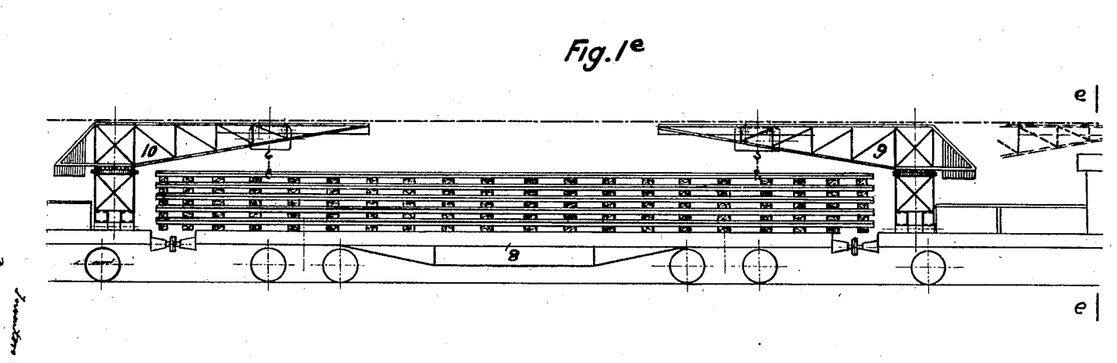
Figure 2:
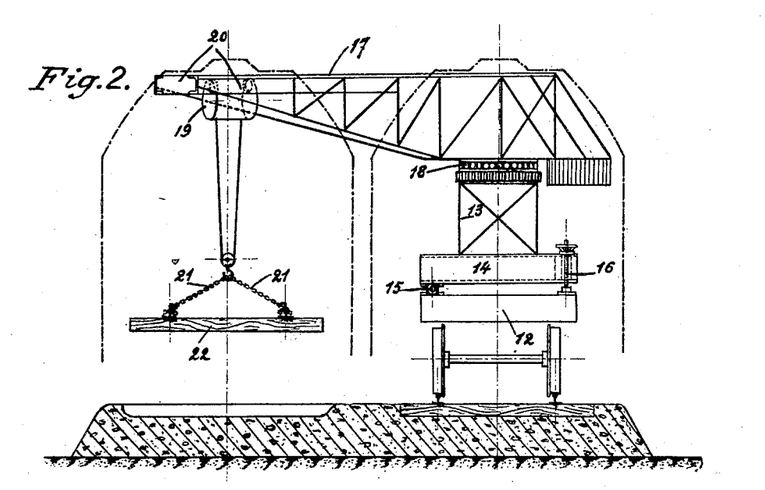
Fig. 2 shows on larger scale a transverse-elevation of one of the cranes.

The crane consists of a metal tower 13 resting on a chassis 14 hingedly mounted on one side, at 15, and fitted with a double screw-jack 16 on the other side. This arrangement permits of ensuring the vertical position of the tower 13 when the car is standing on a gradient in a track-curve.

On the upper part of the tower 13 a pivotal metal jib 17 is resting on a group of rollers 18 and may be controlled, in its rotating movement, by an electric motor with suitable mechanical elements for conveniently reducing the speed.

The lower portion of the jib carries an electric pulley-block 19 of four tons for example, freely rolling between the arms of two irons 20. This pulley-block 19 has two hooking chains 21 designed to put the track 22 on the hooks for picking up the ballast or for laying.

This crane is characterized by:

(a) Its construction width calculated in order to permit of its fitting into the gauge of the tracks, after the jib has been returned into its position along the longitudinal axis of the car.

(b) Its type of pulley-block rolling freely in the interior of the jib as fast as, in the course of the rotation of the same, the suspension point of the lifted track gets closer to or moves away from the axis of rotation of the said jib.

Excavator car

Figure 3:
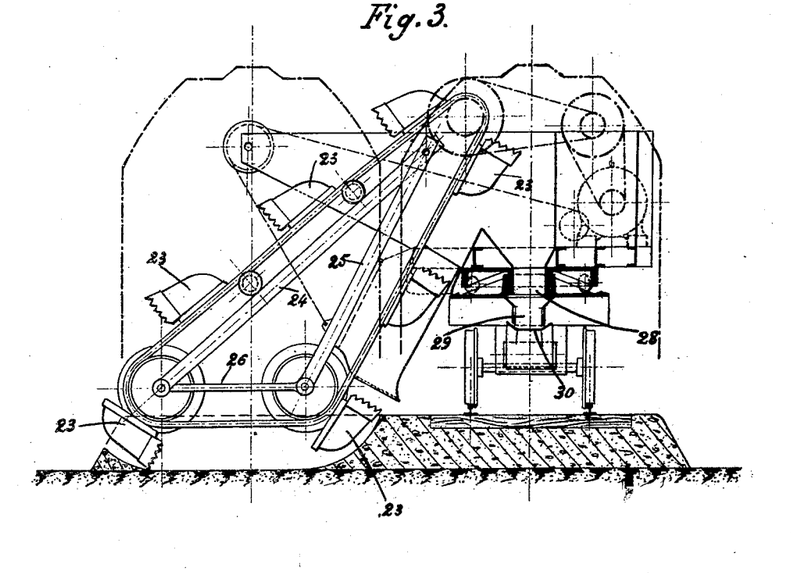
Fig. 3 is an end-elevation showing the excavator-car, partly in section through the pivot axle.
Figure 4:
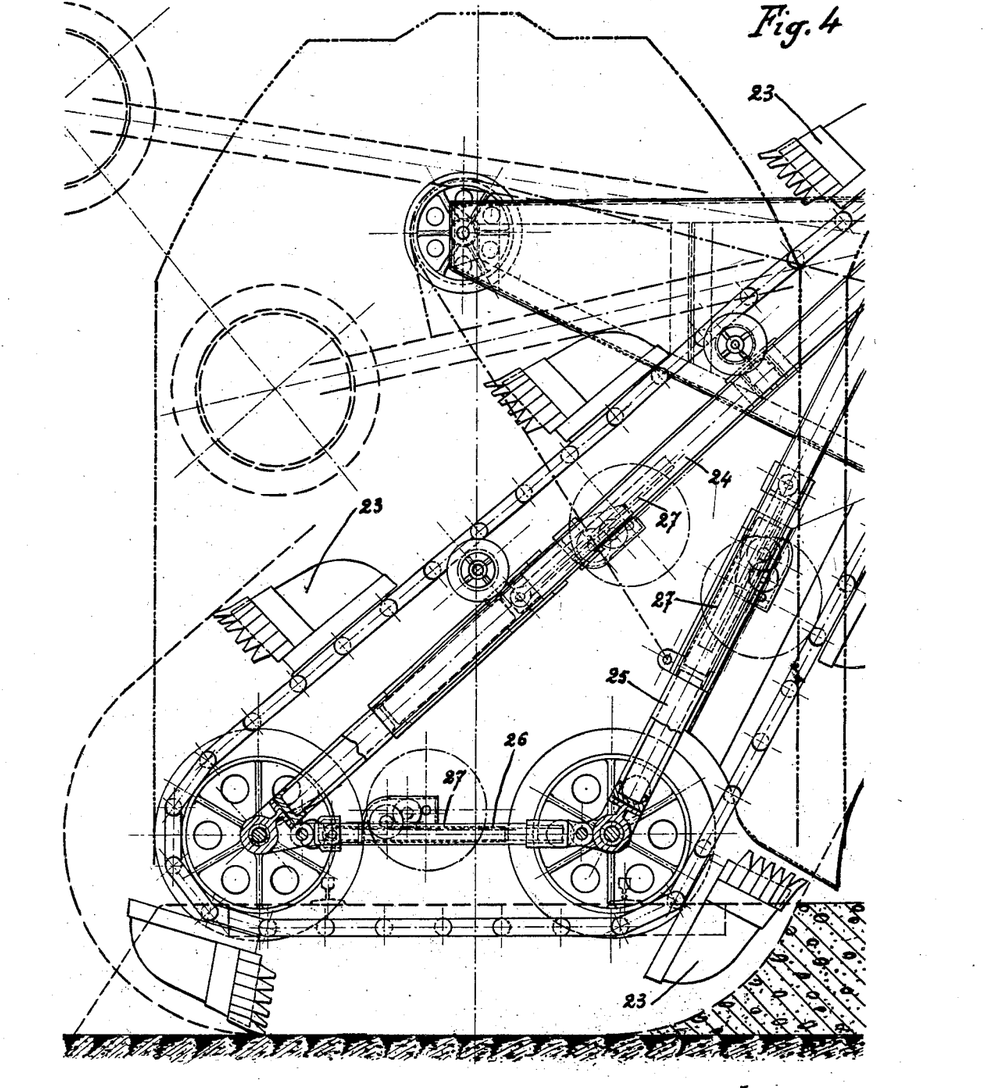
Fig. 4 is the same view as Fig. 3, but on much larger scale and more detailed.
Figure 5:
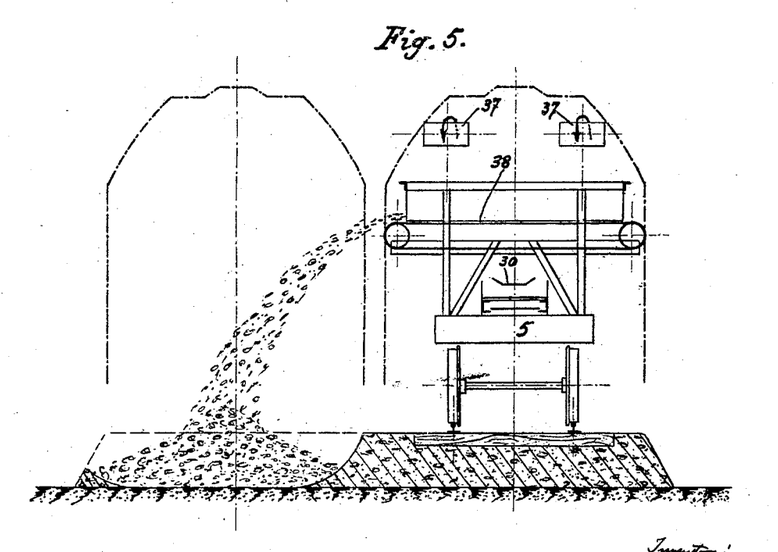
Fig. 5 is a cross-section of the excavator-wagon on line A—A of Fig. 1.

The excavator (Figs. 3, 4 and 5) is of the bucket type and presents the following essential peculiarities:

The guide frame around which the buckets 23 move consists of a triangle adapted to be deformed according to requirements: The three sides 24, 25, 26 of this triangle are telescopic so that they may be adjusted as regards length to give to the lower side 26 different inclinations in the case of gradients. The lengthening or shortening of the sides 24, 25, 26 is obtained by means of racks 27, similar to jacks, or of screws adapted to be rapidly operated with the aid of a crank-handle.

The excavator is pivotal and fits, in the inoperative position and without any taking to pieces, into the gauge of the track.

The pivot axle 28 of this excavator is characterized in that it is hollow.

The buckets 23, after having dredged the ballast, empty their contents into the hollow pivot-axle 28 from where the elements of the ballast are directed into a hopper 29 which discharges the same onto an endless conveyer 30, with belt or plates which directs the same then towards the screening car 6 onto the endless conveyer 31.

Screener car

The screening car 6 (Figs. 1 and 6) carries a rotatable screener 32 fed from the conveyer 31. The screener 32 is perforated, over its entire length, with holes of 30 mm.

Figure 6:
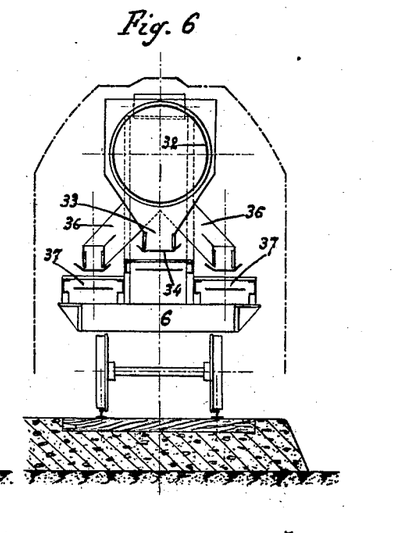
Fig. 6 is a cross-section, showing the screen-wagon.

In passing through the screener the old ballast is stirred in all directions and any elements of a smaller diameter than 30 mm. as well as the detritus and the earth pass through the holes and drop into a hopper 33 which directs the same onto a conveyer 34 arranged in the direction of the longitudinal axis of the screener-car. This conveyer delivers the detritus from screening onto the conveyer 35 with scrapers mounted on the next following hopper car.

Figure 7:
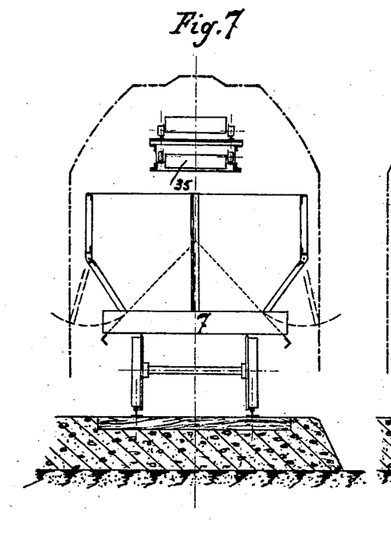
Fig. 7 shows in cross-section one of the hopper-cars.

Hopper cars (Figs. 1 and 7). These cars carry each, in their upper portion, a conveyer 35 with scrapers, the conveyer channel 35a of which has hinged bottom-plates through which the detritus of ballast is discharged over the entire length of the hopper car.

When the first hopper car is filled, all the hinged bottom-plates of the corresponding conveyer with scrapers 35 are to be closed, and the detritus is then conveyed to the end towards the conveyer of the second hopper car which can then be filled, and so forth, if the train comprises more than two hopper cars.

From the foregoing it is evident that, according to the invention, for carrying out the relaying of a track, the elements of the track to be renewed are lifted by the cranes 3 and 4 and placed on the platform-truck 2, whereupon the ballast is mechanically removed by the excavator 5 and supplied to the screening group 6, where it is freed from its fine elements and earth which are then conveyed to the hopper-wagons 7.

The ballast-elements larger than 30 mms. continue to travel to the end of the screener 32 and drop into a chute 36 from which they are delivered to the right and left onto two endless conveyors 37, 37. The screened and purified ballast is then delivered by these two conveyors 37 onto a laterally extending conveyor 38 (Figs. 1 and 5) mounted on the excavator-car. This conveyor 38 is driven at a rather great speed and throws the ballast towards the middle of the formation level of the fresh track and to about 2 meters from the dredging bucket-chain. To reconstitute the fresh formation-level prior to the laying of the elements of the fresh track this ballast has merely to be levelled with a fork.

The laying group constituted like the group for picking up enters then into function and lays, as soon as a certain length of the track has been made ready, a fresh element on said track, said fresh element having been taken from the platform-truck 8 by the cranes 9 and 10.

It has to be mentioned that the excavator can dredge as desired at the right and at the left of the car, and that the conveyor 38, the direction of movement of which may be reversed, is also adapted to throw the ballast to either side.

The mechanical relaying of railway-tracks by the means which have been described is preferably carried out at night, the field of operation being intensively lighted so that the interval of several hours in the circulation of trains can be utilized.

This working method presents the serious advantage of absolutely suppressing any reduction of the train-speed owing to the work, as a train can run at normal speed over a fresh track as soon as it has been tamped.

This method does further do away with the encumbering of the tracks by the relaying material, such as rails and sleepers, old ballast and the like and of all the men commonly employed for this work, and of all the material used by these men, such as screeners, spades, tamping picks, forks and the like. It eliminates a large quantity of manual labour.

In practice the whole of the relaying train, constituted as explained, is provided for a relaying of 100 meters of track per hour, the excavator being capable of picking up ballast 100 meters per hour, this figure being however only given by way of example and it will be possible by an appropriate organization to increase the length of relaying, in considering the intervals at disposal.

Figure 8:
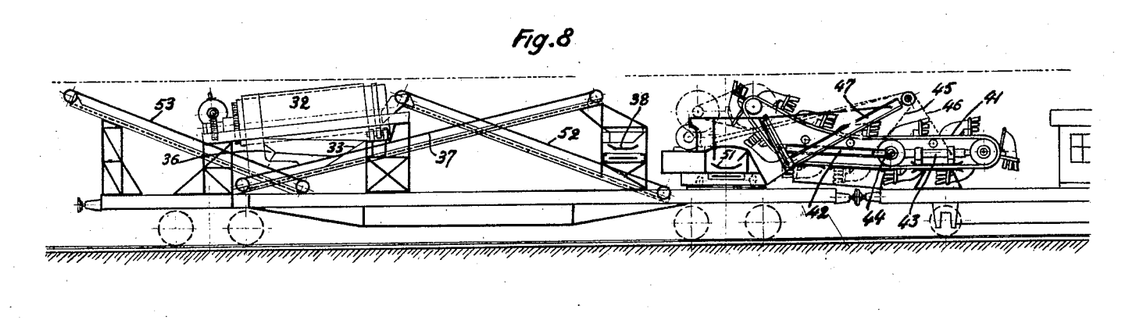
Fig. 8 shows a modified form of construction of the excavator and screener on one and the same car.
Figure 9:
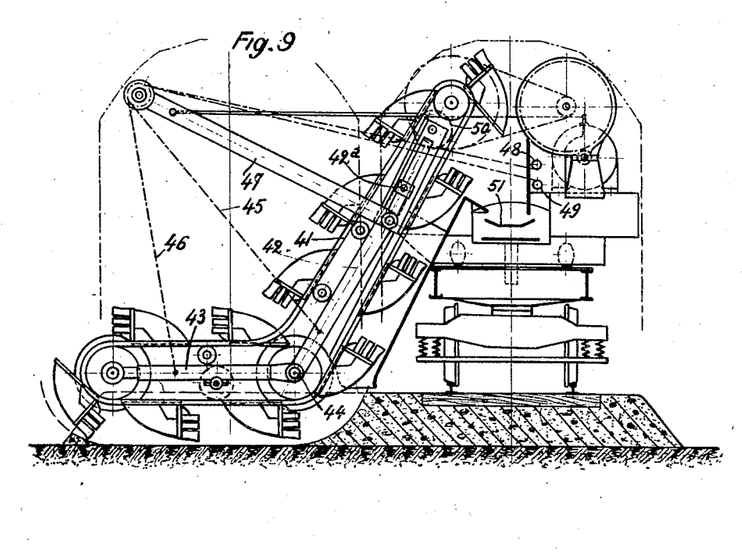
Fig. 9 is an end-view of the excavator of a second form of construction.
Figure 10:
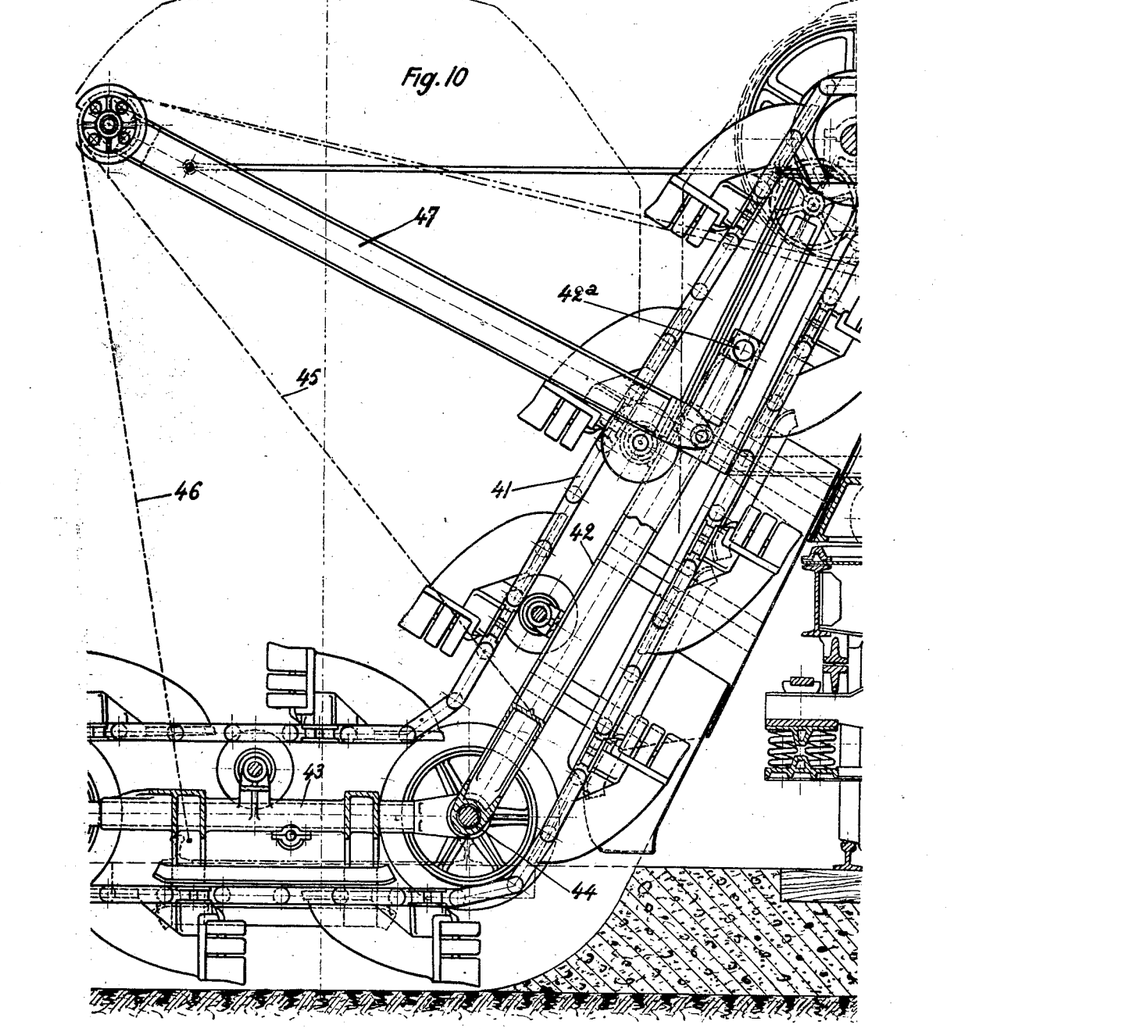
Fig. 10 is a similar view as Fig. 9 but on much larger scale and showing more details.

The excavator and the screener may be united on one and the same car. Figs. 8, 9 and 10 show an arrangement of this kind in which the excavation is carried out in a form different from that which has been above described. The guide-frame, around which the chain 41 with buckets moves and by which it is guided, is composed of two parts, the one part 42 being hingedly mounted on the stationary frame so that it can oscillate around the axle 42a at its upper end, whilst at its lower end it is hingedly connected at 44 to the second part 43 which, in the operative position, extends horizontally over the entire width of the formation-lever to be renewed. On gradients any desired inclination can however be given to this part 43. This guide frame is supported by cables 45, 46 which, after having passed over a pulley, arranged at the end and of the boom 47, are wound around the winches 48, 49 driven each by a motor, so that the two parts of the guide-frame can be lifted and lowered to be adjusted to the desired position. At the upper part of the guide-frame grooved elements are arranged so that this guide-frame can be raised and lowered, these elements being operated by two screws driven by the handwheel 50. The lower part of the guide-frame is telescoped so that it can be lengthened and shortened to regulate the length of the bucket chain.

In the operative position the buckets 41, after having dredged the ballast, discharge the elements of ballast onto a horizontal conveyor 51 which delivers the same to a conveyor 52 which conducts them to the screener 32. The detritus drops into the hopper 33 which delivers it onto the conveyor 53 leading to the scraper conveyor of the hopper-car following the excavator-screener car. The ballast drops into a chute 36 which directs the same to the right and to the left onto two endless conveyors 37 and 37 from which the ballast is delivered to a laterally extending conveyor 38 which throws the ballast towards the middle of the formation-level. This excavator is pivotal and having been brought for transport into the axial direction of the car as shown in Fig. 8 it fits into the gauge of the track.

The invention comprises further, based on the same characteristics, a modification of the relaying train designed to work on a single track. This modification (Figs. 11, 12, 13) comprises the utilization of a special pivotal excavator which works at the rear of the car on which it is mounted.

Figure 11:
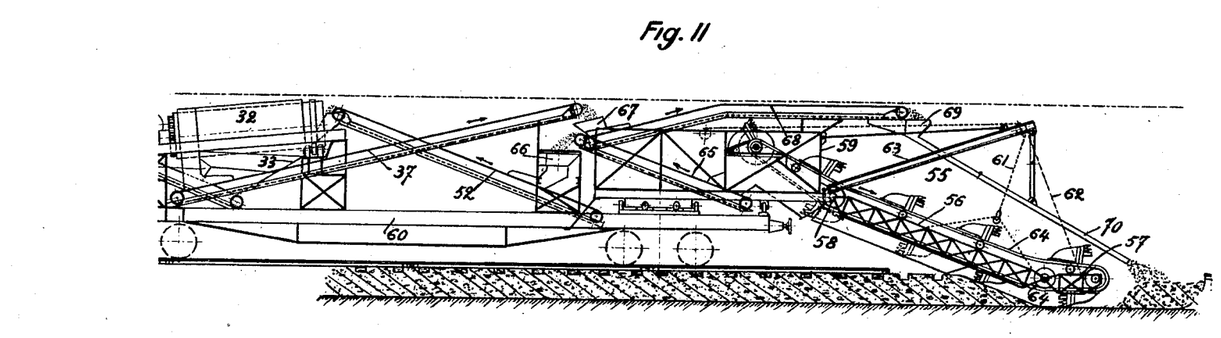
Fig. 11 shows a form of construction of the excavator and screener for a single track in the operative position.
Figure 12:
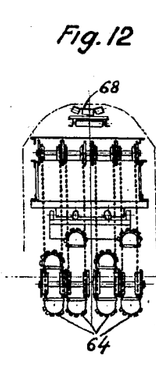
Fig. 12 is an end-view of Fig. 11.
Figure 13:
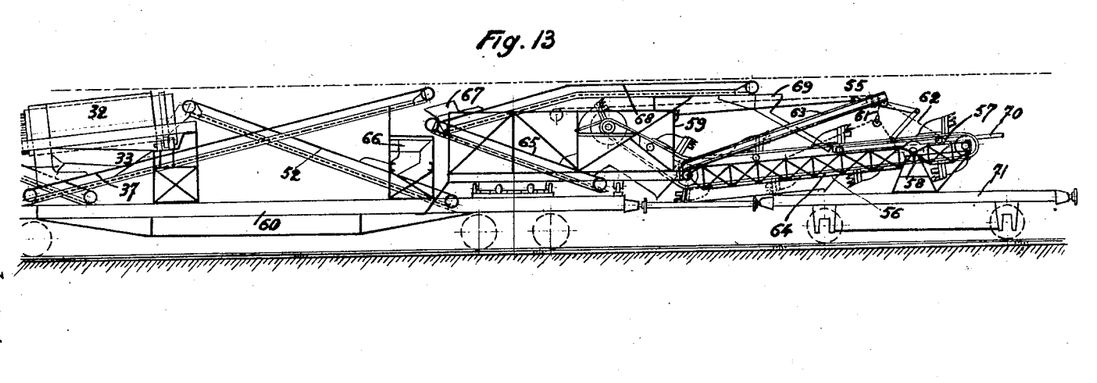
Fig. 13 is a similar view as Fig. 11, the excavator being shown in the position for transport.

This excavator 55 comprises a guide-frame composed of two parts 56 and 57 hingedly connected the one with the other, the first part 56 being hingedly connected at 58 to the stationary frame 59 fixed on the rear end of the car 60. The two parts of this guide frame are suspended by cables 61 and 62 to a boom 63 mounted on the rear-end of the car 60. The dredging chain 64 guided on the guide-frame comprises in width several dredging buckets, as shown in Fig. 12, so that it can work almost over the entire width of the formation-level.

On the car which carries this excavator a screener 32 is further mounted. The buckets, after having dredged the ballast at the rear of the car, throw the elements of ballast onto the conveyor 65 which throws them into the hopper 66 from which they drop on the conveyor 52 which conducts them to the screener. The detritus drops into the hopper 33 which delivers it onto the conveyor 53 which conducts it to the scraper-conveyor of the hopper-car behind the excavator screener-car 60. This detritus might also, in certain cases, especially when the track consists of an embankment, be rejected by the conveyor 53 on the side of the formation-level with the aid of a transverse or pivotal conveyor. (This modification might be made in all the forms of construction for double tracks described above.)

The screened and purified ballast drops into a chute 36 which directs it to the right and left upon the two conveyors 37 which deliver it into a hopper 67 from which it drops onto a conveyor 68 which conveys the ballast to a hopper 69 forming the upper portion of a chute 70 in which the ballast descends to be spread on the portion of the formation-level which has just been cleared.

This excavator pivots slightly during the working to take the ballast which is on the side of the formation-level.

The working method on a single track with the relaying-train composed in this manner is as follows: The two rails (of 18 meters for example) behind the train are removed with the aid of means which are independent of this invention. For each of these rails two rail-sections of 6 meters are substituted to cover 12 meters, and the sleepers on the remaining 6 meters are removed. The train is then run to this place to clear this part of 6 meters, and then moved forward to clear the next following part of 6 meters from which the rail-sections have been removed in the mean time. The third part of 6 meters is then worked in the same manner, whereupon the train is made to run backward so that two other rails of 18 meters can be removed and so forth. On the portion of the formation-level which has been renewed the track is laid again with the aid of means which are independent of the invention.

For transport the guide-frame of the excavator (Fig. 13) is slightly lifted by means of the cables 61, 62 and placed on a track-car 71 to be coupled with the car 60.

Figure 14:
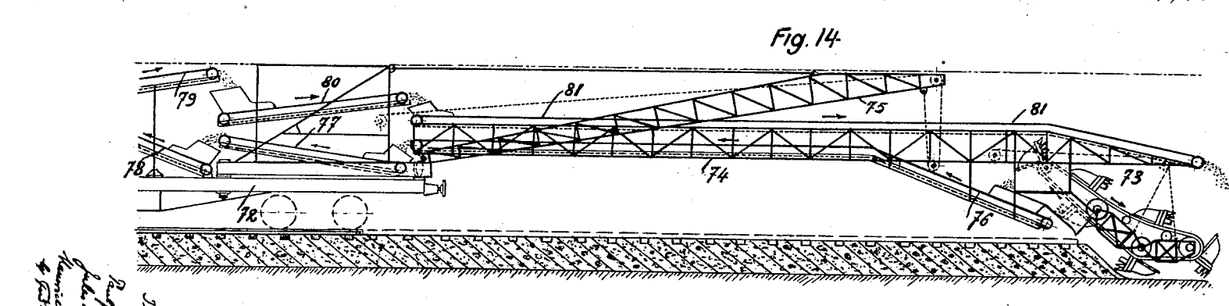
Fig. 14 shows in the operative position an excavator and screener for a single track of another form of construction.
Figure 15:
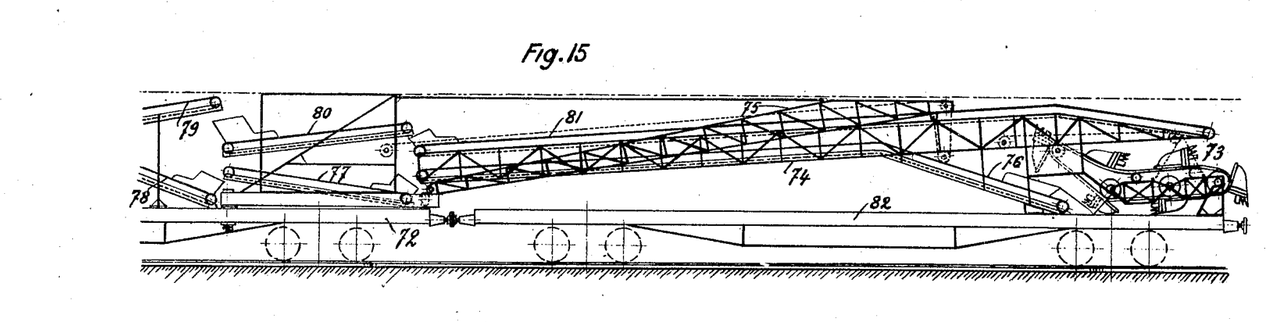
Fig. 15 is a similar view as Fig. 14 the excavator being in the inoperative position for transport.

The relaying-train for single track might also comprise as shown in Figs. 14 and 15 a special excavator 73 mounted at the end of a very long arm 74, suspended to a crane 75 and hingedly mounted at the rear end of the car 72 on which are further mounted the screener 32 and the conveyors.

The excavator 73, operated by an electric motor, throws the ballast which it has dredged upon the endless conveyor 76, this ballast being conducted to the screener by said conveyor 76 and the conveyors 77 and 78 which form the continuation of the endless conveyor 76. The detritus is conducted by the means already indicated to the hopper car in front of car 72, the screened and purified ballast being conveyed by the conveyors 79, 80 and 81 to the end of the arm 74 and thrown onto the formation-level.

This arrangement permits of recharging the formation-level over the entire length of one track without the necessity of laying rail-sections as in the other form of construction.

For the transport the arm 74 carrying the excavator is slightly lifted by means of the crane 75 and then lowered onto a track-car 82, coupled to the car 72.

We claim:—

1. A train for relaying railroads, comprising in combination a group of platform cars, two cranes on each platform car for picking up the elements of the cleared track, an excavator car, an excavator on said car, the guide frame of said excavator consisting of a deformable triangle the sides of which can be lengthened or shortened, a hollow pivot axle of said excavator frame through which the dredged ballast is discharged, a conveyor, a screener car, a screener on said car supplied with ballast from said conveyor of said excavator car to free the ballast of its fine elements and of the earth which it may contain, an endless conveyor on said car adapted to receive the screened ballast, a transverse conveyor adapted to receive the reclaimed ballast and to deliver it onto the foundation of the cleared track, a conveyor adapted to receive and convey the detritus from screening, hopper cars, a conveyor on each of said hopper cars adapted to receive the detritus from screening and to discharge the same over the entire length of said hopper car, a platform car carrying the elements of the fresh track, and two cranes mounted adjacent the ends of said platform car and designed to deposit said track elements on the cleared road-bed.

2. A train for relaying railroads, comprising in combination a group of platform cars, means on said cars for picking up the elements of the cleared track, an excavator- and screener-car, an excavator comprising a hingedly mounted guide frame composed of two adjustable and extensible arms, the lower of said arms adapted to extend in the operative position over the entire width of the formation level to be relaid and to be more or less inclined to the horizontal plan, a screener, endless conveyers for conducting the ballast to said screener, an endless conveyer adapted to receive the ballast from the screener, an endless conveyer for discharging the cleaned ballast onto the track to be relayed, a hopper car, a scraper conveyer on said hopper car, a conveyer on the rear end of said excavator- and screener car adapted to receive and convey the detritus of ballast, and a group of platform cars with means for laying fresh elements on the cleared track.

3. A train for relaying railroads, comprising in combination a platform car, an excavator on one end of said car, a screener on said car, a conveyer for conveying ballast from said excavator to said screener, a conveyer for discharging the cleaned ballast from said screener, a conveyer for discharging the detritus of ballast from said screener, a system of longitudinal conveyers forming the continuation of said screener conveyer, and means for discharging behind said excavator the ballast received from said longitudinal conveyers.

In testimony whereof we affix our signatures.

PAUL GUILBERT.
JULES LEGRAND.
MAURICE LEMAIRE.